(12) United States Patent
Boyd et al.

(10) Patent No.: US 6,568,822 B2
(45) Date of Patent: May 27, 2003

(54) LINEAR ILLUMINATION SOURCE

(75) Inventors: Gary T. Boyd, Woodbury, MN (US); Leland R. Whitney, St. Paul, MN (US); Richard A. Miller, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/844,745

(22) Filed: Apr. 6, 2001

(65) Prior Publication Data

US 2002/0181222 A1 Dec. 5, 2002

(51) Int. Cl.[7] ................................................. F21V 7/04
(52) U.S. Cl. .................. 362/31; 362/330; 362/334; 362/340; 362/26
(58) Field of Search ................. 362/330, 31, 27, 362/555, 334, 333, 339, 340, 26, 24, 88, 85; 313/512; 349/61, 62, 65, 70

(56) References Cited

U.S. PATENT DOCUMENTS

| | | | |
|---|---|---|---|
| 563,836 A | * 7/1896 | Blondel et al. | 362/334 |
| 614,148 A | * 11/1898 | Walsh | 362/334 |
| 1,437,580 A | * 12/1922 | Wilson | 428/161 |
| 3,078,364 A | * 2/1963 | Neugebauer | 362/26 |
| 4,528,617 A | 7/1985 | Blackington | |
| 4,751,615 A | 6/1988 | Abrams | |
| 5,163,748 A | 11/1992 | Messinger | |
| 5,309,544 A | 5/1994 | Saxe | |
| 5,506,929 A | 4/1996 | Tai et al. | |
| 5,552,907 A | * 9/1996 | Yokota et al. | 359/49 |
| 5,613,751 A | 3/1997 | Parker et al. | |
| 5,688,913 A | 11/1997 | Arrhenius et al. | |
| 5,835,661 A | 11/1998 | Tai et al. | |
| 5,901,266 A | 5/1999 | Whitehead | |
| 6,065,845 A | * 5/2000 | Miyazaki | 362/26 |
| 6,139,163 A | 10/2000 | Satoh et al. | |

FOREIGN PATENT DOCUMENTS

| | | |
|---|---|---|
| EP | 1 076 205 A | 2/2001 |
| WO | WO00 01986 A | 1/2000 |

OTHER PUBLICATIONS

Marshall et al., U.S. Publication 2002/0080615 A1, Jun. 27, 2002.*
U.S. patent application Ser. No. 09/844,744, Epstein et al., filed Apr. 6, 2001.
U.S. patent application Ser. No. 09/827,732, Boyd, filed Apr. 6, 2001.
D. Jensen & R. Wilson, Applied Optics: New Reflectors For Illumination Http://hep.uchicago.edu/solar/light.html (Accepted for Publication).
Proceedings of SPIE Conference 2538, Nonimaging Optics: Maximum Efficiency Light Transfer III, R. Winston, ed. (International Society for Optical Engineering, San Diego, CA Jul. 1995.

* cited by examiner

Primary Examiner—Sandra O'Shea
Assistant Examiner—Sharon Payne
(74) Attorney, Agent, or Firm—Stephen W. Buckingham (57) ABSTRACT

Shaped refractive articles having compound curved surfaces enable a light source to provide substantially uniform illumination of a linear or planar target. The refractive articles can comprise an input edge or face and an output edge or face, the input edge or face having at least one shaped notch or cavity that can at least partially envelop a light source, wherein the notch or cavity has at least two oppositely signed curved portions shaped to provide substantially uniform illumination of a target by the source. The articles can also be optically coupled to and at least partially envelop a light source, and can have an output edge or surface having at least two oppositely signed curved portions shaped to provide substantially uniform illumination of a target region by the source. The shaped articles can be used in, for example, lighting devices, frontlights, backlights and electronic displays.

38 Claims, 9 Drawing Sheets

LINEAR ILLUMINATION SOURCE

TECHNICAL FIELD

This invention relates to light sources, including light emitting diodes, to point to line and point to plane light converters, and to lighting devices, frontlights, backlights and electronic displays.

BACKGROUND ART

Various applications require a light source that is extended in one dimension, referred to as a line source. A simple example is the cold-cathode fluorescent tube (CCFT) commonly used in signage, room lighting, and for illuminating the input edge of slab waveguides used for display backlighting or front lighting. To reduce costs and improve energy efficiency, it is desirable to replace CCFT sources with discrete or point-like sources (that is, sources in which the chief rays originate approximately from a point) such as light emitting diodes (LEDs) or small filament incandescent lamps, utilizing methods to spread the light from these sources along a line. Methods for spreading the light include the use of a point to line converter consisting of a bar or cylindrically shaped light guide with prismatic features along the long axis to reflect and redirect light propagating through the light guide, e.g., as in U.S. Pat. Nos. 4,528,617 (Blackington); 5,506,929 (Tai et al. '929); 5,688,913 (Tai et al. '913) and 5,835,661 (Tai et al. '661). Such methods tend to rely on total internal reflection and are often inefficient, losing as much as 50% of the light due to total internal reflection failure. Another method uses diffusive scattering along a line, e.g., by incorporating diffusive features within the light guide to disperse and redirect light propagating through the light guide. These diffusive scattering methods generally suffer from non-uniformity, low efficiency, and coloration resulting from the wavelength dependence of the scattering mechanism. Other point to line converters are shown in U.S. Pat. Nos. 4,751,615; 5,163,748; 5,613,751; and 5,901,266.

Some applications require a light source that is extended in two dimensions, referred to as a plane source. For example, a backlight and point to plane converter for one or more LEDs is shown in U.S. Pat. No. 6,139,163, and a light pipe is shown in U.S. Pat. No. 5,309,544.

Several papers by R. Winston of the University of Chicago and others discuss "nonimaging optics" and the use of nonimaging optics for the design of solar concentrators, see e.g., Proceedings of SPIE Conference 2538, Nonimaging Optics: Maximum Efficiency Light Transfer III, R. Winston, ed. (International Society for Optical Engineering, San Diego, Calif., July 1995). An article by D. Jenkins and R. Winston appearing on the Internet at http://hep.uchicago.edu/solar/light.html and entitled "New Reflectors for Illumination" discusses the use of nonimaging optics and shaped reflectors for use in illumination.

SUMMARY OF THE INVENTION

Existing point to line and point to plane converter devices do not always provide sufficiently even light output, especially when the light source itself has non-uniform or asymmetric light output. Often these converter devices must rely on downstream components (e.g., the backlight or frontlight in a display) to improve the evenness of the light output seen by a viewer of the display.

We have discovered shaped refractive articles that provide substantially even distribution of light from one or more point-like light sources to a target line or target plane. When illuminating a target line, the shaped articles will typically be thin and substantially two-dimensional, and can provide point to line conversion. When illuminating a target plane, the shaped articles will typically be thicker and substantially three-dimensional, and can provide point to plane conversion. The target can be a part of the refractive article or located remotely from the article. We will refer to illumination of a target line or target plane on a refractive article as illumination of a "target aspect". We will refer to illumination of a target line or target plane remote from a refractive article as illumination of a "target region". We will use the word "target" to refer collectively to a target aspect or target region.

In one embodiment, the refractive articles of the invention comprise an input edge or face and an output edge or face, the input edge or face having at least one shaped notch or cavity that can at least partially envelop a light source, wherein the notch or cavity has at least two oppositely signed curved portions shaped to provide substantially uniform illumination of a target by the source. If the notch or cavity is divided into two parts, then each part preferably has a first curved portion near the target that is concave with respect to the light source, and a second curved portion more remote from the target that is convex with respect to the light source, with the second curved portion being shaped to illuminate the target at approximately the same light intensity per unit of target length as the first curved portion.

In another embodiment, the refractive articles of the invention are optically coupled to and at least partially encapsulate a light source, and have an output edge or surface having at least two oppositely signed curved portions shaped to provide substantially uniform illumination of a target region by the source. These latter refractive articles preferably have a first curved portion of the output edge or surface that is convex with respect to the light source, at least partly surrounded by a second curved portion that is concave with respect to the light source, with the second curved portion being shaped to illuminate the target at approximately the same light intensity per unit of target area as the first curved portion.

In another embodiment, the invention provides a method for illuminating a target using a light source, comprising refracting light from the source through a refractive article having an edge or surface having first and second oppositely signed curved portions shaped to provide substantially uniform illumination of the target by the source, wherein the second curved portion is shaped to illuminate the target at approximately the same light intensity per unit of target length as the first curved portion.

In yet another embodiment, the invention provides a method for designing a curved portion of a shaped refractive article to provide substantially uniform illumination of a target by light from a source that is refracted through the curved portion, comprising the step of shaping the curved portion so that it substantially obeys the following equations:

$$\sin\theta_2 = \left(\frac{n_1}{n_2}\right)\sin(\alpha - \theta_0)$$

$$\tan(\alpha - \theta_2) = \frac{x_f - x_s}{d - y}$$

$$\tan\theta_0 = \frac{x_s}{y}$$

-continued
$$\frac{dy}{dx_s} = -\tan\alpha$$

$$\frac{dx_f}{d\theta_0} = \left(\frac{1}{C}\right)\frac{dI_0}{d\theta_0}$$

in a Cartesian coordinate space in which the x-axis is parallel to the target, the y-axis is perpendicular to the target, and the source is at the origin, wherein:

$(x_s, y)$ is the position of a point on the curved portion, $\theta_2$ is the angle of refraction of a light ray at position $(x_s, y)$, $n_1$ is an index of refraction between the source and the curved portion, $n_2$ is an index of refraction between the curved portion and the target, $\alpha$ is the angle of the curved portion with respect to the x-axis at position $(x_s, y)$, $\theta_0$ is the angle made by light rays from the source with respect to the y-axis, $x_f$ is the position of a point on the target along the x-axis, d is the distance from the source to the target along the y-axis, $dI_0/d\theta_2$ is the distribution of light from the source, C is the desired illuminance at a point on the target, equal to $I_{00}/2x_{f0}$ $I_{00}$ is the total optical output power of the source and $x_{f0}$ is the half-length of the target, measured along the x-axis.

The invention also provides lighting devices, frontlights, backlights and displays comprising one or more of the above-mentioned refractive articles.

BRIEF DESCRIPTION OF THE DRAWING

FIG. 13b is a graph showing ray tracing simulations for light rays passing through the article of FIG. 12, with and without the prismatic features of FIG. 13a.

DETAILED DESCRIPTION OF THE INVENTION

Figure 1:
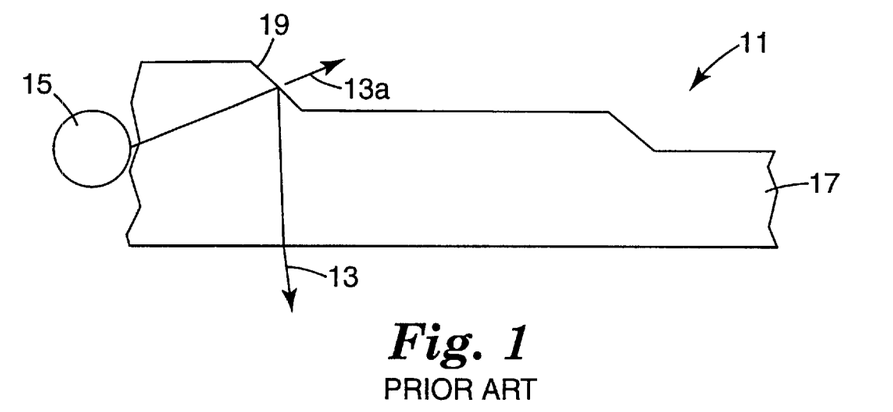
FIG. 1 is a schematic side view of a prior art light guide having prismatic features along the long axis to reflect and redirect light propagating through the light guide.

Referring first to FIG. 1, a prior art prismatic light guide 11 has prismatic features along its long axis to reflect and redirect light propagating through the light guide. Light rays such as light ray 13 from source 15 pass into light guide 17 and are reflected by facets such as facet 19 towards a display (not shown in FIG. 1). Light rays such as light ray 13a that pass through a prism rather than being reflected by total internal reflection represent lost light that cannot be used to illuminate the display.

Figure 2:
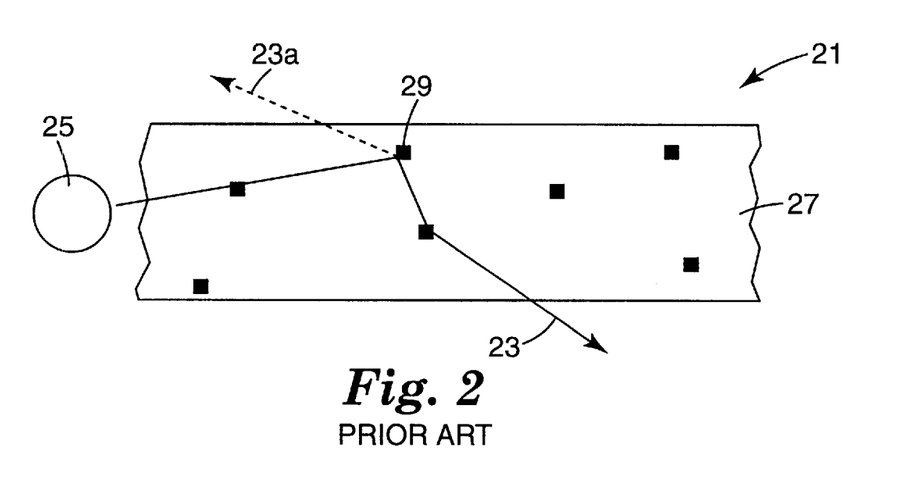
FIG. 2 is a schematic side view of a prior art light guide having diffusive features within the light guide to disperse and redirect light propagating through the light guide.

Referring next to FIG. 2, a prior art light guide 21 has diffusive features within the light guide to disperse and redirect light propagating through the light guide. Light rays such as light ray 23 from source 25 pass into light guide 27 and are reflected by diffusing particles such as diffusing particle 29 towards a display (not shown in FIG. 2). Light rays such as light ray 23a that are scattered by a diffusing article in an undesired direction away from the display represent lost light that cannot be used to illuminate the display.

Figure 3:
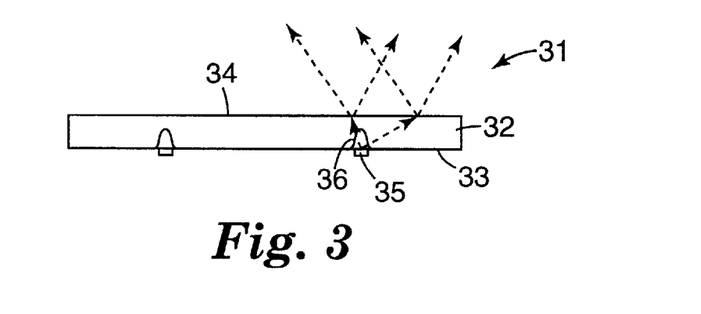
FIG. 3 is a sectional side view of a refractive article of the invention.

FIG. 3 shows a sectional side view of a refractive article 31 of the invention, in the form of a clear slab of material 32 having an input edge or face 33 and an output edge or surface 34 forming a target aspect. If article 31 is thin and substantially two-dimensional, then feature 33 is an input edge, feature 34 is an output edge and the target aspect is essentially a line segment. If article 31 is thicker and substantially three-dimensional, then feature 33 is an input face, feature 34 is an output surface and the target aspect is a portion of a plane. For simplicity, we will discuss an embodiment in which article 31 is thin, feature 33 is an input edge, feature 34 is an output edge and the target aspect is a line segment. Article 31 has one or more specially shaped notches 36 located along input edge 33 into which light from point-like sources 35 (e.g., LEDs) is directed. Output edge 34 has a diffusive surface or bulk diffuser along its length in order to illuminate the target aspect more evenly. Light from sources 35 is refracted at the curved portion of notches 36 toward output edge 34. The notches 36 are specially shaped to provide an optimal transfer of light from the sources 35 along the length of the output edge 34, in a linearly uniform manner, thereby providing substantially uniform illumination of output edge 34 by source 35. For example, the bell-shaped notches 36 shown in FIG. 3 will transform light from a point source whose output is uniform with respect to angle, into a line source whose output is uniform with respect to position along the target aspect formed by output edge 34. The shapes of the notches provide uniform illumination of the target over long lengths and will permit use of a point source or sources in place of a linear light source.

Figure 4:
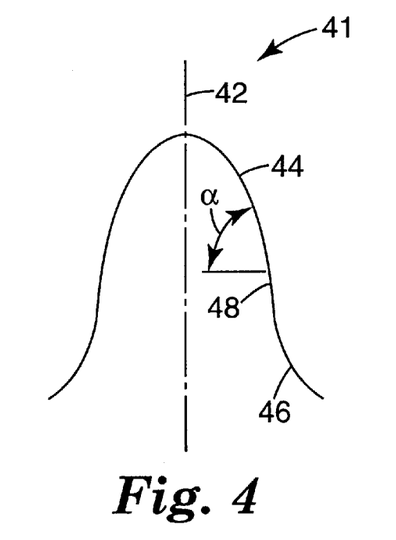
FIG. 4 is an enlarged sectional side view of a cavity having a curved portion with at least two oppositely signed curvatures.

A notch of FIG. 3 is shown in greater detail in FIG. 4. Notch 41 has imaginary midline 42. The general shape of notch 41 is typically symmetric with respect to midline 42, although an asymmetric shape may be used to achieve an asymmetric linear illumination if desired, or to accommodate a non-symmetric light source. Air lies between the light source and the notch 41. Each half of notch 41 has two oppositely signed curved portions 44 and 46 that join smoothly (to avoid discontinuities in illumination) at inflection point 48. Referring now to both FIG. 3 and FIG. 4, curved portion 44 is concave with respect to light source 35. Curved portion 46 is convex with respect to light source 35. The instantaneous angle of the curve with respect to the target is referred to as α, and is typically less than 90 degrees.

Figure 5:
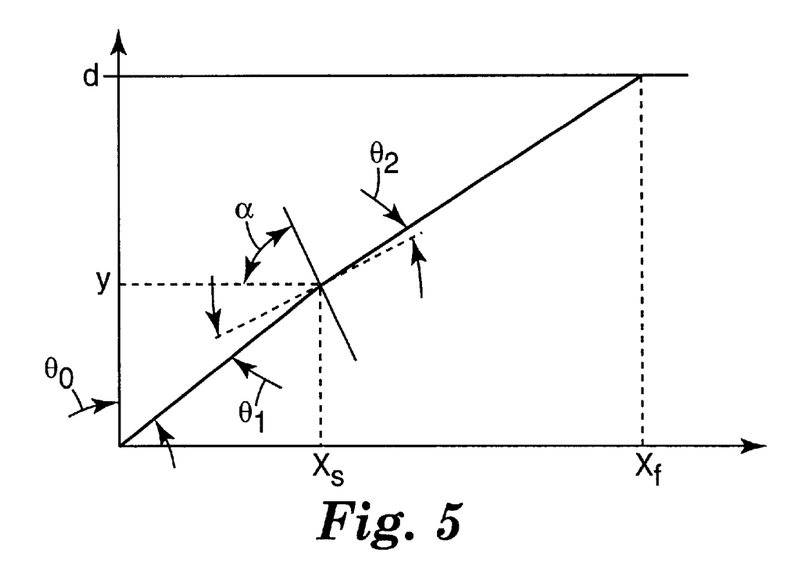
FIG. 5 illustrates angular relationships for the cavity of FIG. 4.

The following equations are invoked to generate the shape for the notch:

$$\sin\theta_2 = \left(\frac{n_1}{n_2}\right)\sin(\alpha - \theta_0)$$

$$\tan(\alpha - \theta_2) = \frac{x_f - x_s}{d - y}$$

$$\tan\theta_0 = \frac{x_s}{y}$$

$$\frac{dy}{dx_s} = -\tan\alpha$$

where $n_2$ is the index of refraction of the refractive article, and $n_1$ is the refractive index of the medium between the light source and refractive article. Referring to FIG. 5, the remaining equation values can be defined as follows. In FIG. 5, the x-axis is parallel to the target, and typically will also be parallel to input edge 33 of refractive article 31. The y-axis is perpendicular to the target, and coincides with the midline of notch 41. Source 35 is at the origin. The target is a distance d from source 35. In the case where the medium between source 35 and refractive article 31 is air, $n_1=1$, and $n_2$ is referred to simply as n. The curved portion of notch 41 then presents an air/medium interface between the interior of notch 41 and refractive article 31, and makes an angle α with respect to the x-axis. Light rays from source 35 make an angle $\theta_0$ with respect to the y-axis, and impinge on the air/medium interface of refractive article 31 at an incident angle $\theta_1$ and a position $(x_s, y)$. The angle of refraction in refractive article 31 is $\theta_2$.

A specific design results from the above equations by choosing values for refractive index, n, and distance, d, and relating any two remaining variables. The equations then determine the height, y, of a notch as a function of its lateral extent, $x_s$. To obtain a uniform light distribution along a target from a known illuminance distribution, $dI_0/d\theta_2$, the position $x_f$ can be related to $\theta_0$ by the equation:

$$\frac{dx_f}{d\theta_0} = \left(\frac{1}{C}\right)\frac{dI_0}{d\theta_0}$$

Here, C is the desired illuminance $C=I_{00}/2x_{f0}$, where $I_{00}$ is the total optical output power and $x_{f0}$ is the half-length of the line of desired light distribution. A design goal is to maximize $x_{f0}$ in order to minimize the number of light sources required to illuminate a particular length.

In one embodiment of the invention, a notch is designed to direct rays from an idealized point source where $dI_0/d\theta_0$ is a constant with respect to $\theta_0$, towards a target that is to be illuminated by light approximately uniformly distributed along a line segment. Then $x_f$ and $\theta_0$ will be linearly related by the equation $x_f = x_{f0}\theta_0/90$. The notch design that results from this criterion is shown by curve 62 in FIG. 6 for a case in which n=1.49, d=5 mm and $x_{f0}$=15 mm. Through the use of this design, a point source will substantially evenly illuminate a 30 mm long target located 5 mm from the source.

Figure 6:
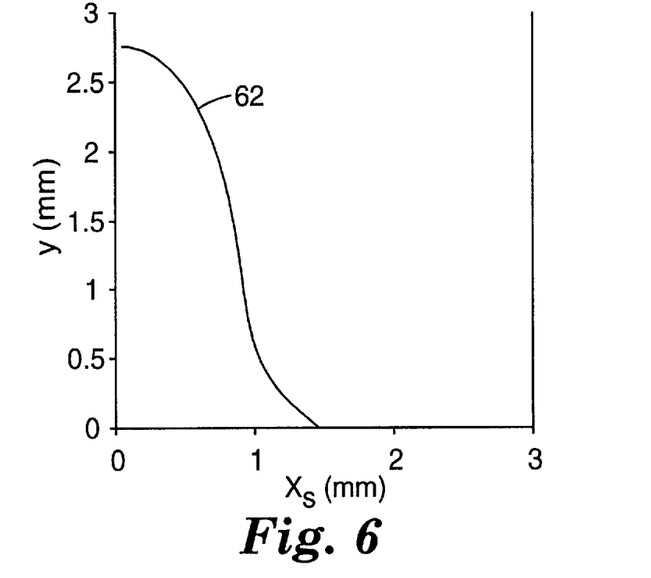
FIG. 6 is a graph showing one-half of a notch or cavity shape.
Figure 7:
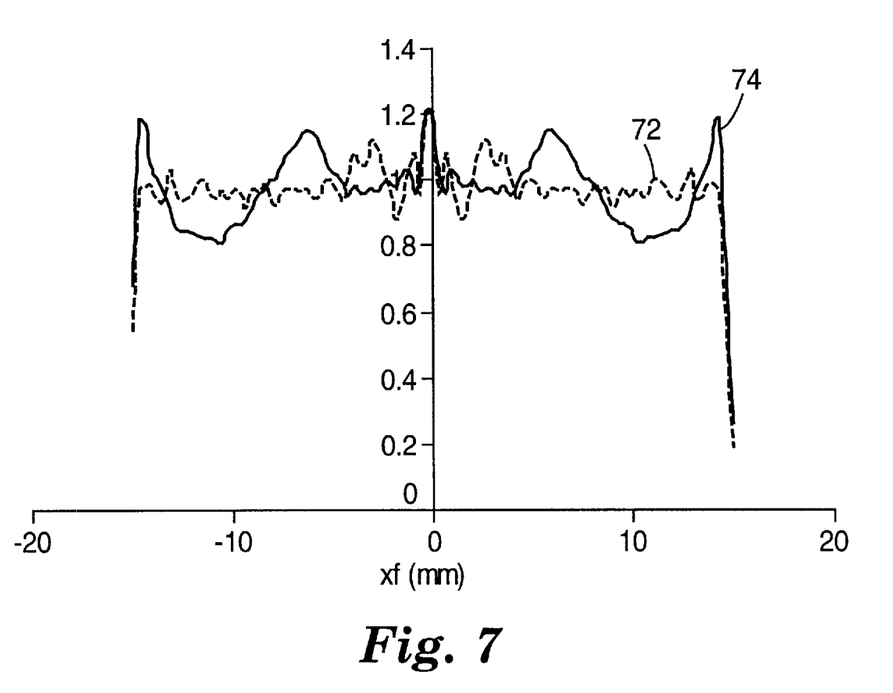
FIG. 7 is a graph showing ray tracing simulations for the illumination of a 30 mm long target using a refractive article of the invention that contains a cavity shaped as in FIG. 6 enveloping a point source or a 1 mm wide LED.

A ray tracing simulation for the design of FIG. 6 is shown as curve 72 in FIG. 7. As shown in FIG. 7, the target receives very uniform illumination over a 30 mm wide span, or in other words across a lateral extent 10 times the width of the notch. The light intensity along the target is within about ±20% of the average illumination intensity.

Curve 74 in FIG. 7 is a ray tracing for a 1 mm wide source that extends over the central ⅓ of the notch entrance. Such a source is more representative of a typical LED than the idealized point source represented by curve 72. As shown by curve 74, the target still receives very uniform illumination over a 30 mm wide span, or in other words across a lateral extent 30 times the width of the source and 10 times the width of the notch, with a light intensity within about ±20% of the average illumination intensity.

The results in FIG. 7 show that for both the idealized point source and the 1 mm wide source, there is a significant expansion of the apparent size of the light source and the target is illuminated with a high degree of uniformity. Thus these designs facilitate replacement of a line light source with one or more much smaller light sources such as LEDs.

Figure 8:
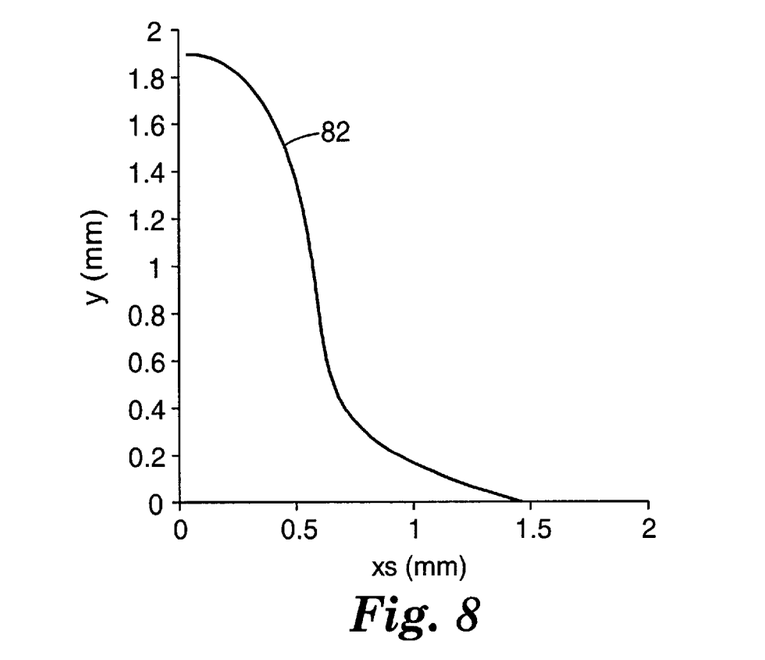
FIG. 8 is a graph showing one-half of another notch or cavity shape.

In another embodiment of the invention, the light source can have a Lambertian light distribution, where the source illuminance varies as $\cos^2(\theta_0)$. Using the above equations the relationship between $\theta_0$ and $x_f$ becomes:

$$x_f = \frac{2x_{f0}}{\pi}(\sin(\theta_0)\cos(\theta_0) + \theta_0)$$

and the shape of the notch can be recalculated to take account of the modified light distribution. The resulting shape for one side of the notch for the Lambertian source is shown by curve 82 in FIG. 8, for the case in which d=5 mm and $x_{f0}$=9 mm. Compared to an idealized point source, a higher degree of curvature is required in the portion of the notch that is convex to the Lambertian source, due to the weaker illuminance at high values of $\theta_0$.

Those skilled in the art will appreciate that the invention is not limited to the light source distribution examples discussed in connection with FIG. 6 through FIG. 8. By utilizing the equations shown above, the notch shape can readily be altered to accommodate examples where the light source output varies in other ways.

The above equations can be further generalized to include examples in which the interior of the notch is filled with a low index medium other than air. Typically, for embodiments of the invention in which $n_1 > n_2$, the target is a target aspect and thus part of the refractive article. However, if desired the target can be a target region located remotely from the refractive article. In such instances the light will pass through a third medium between the refractive article and the target, and there typically will be three applicable indices of refraction, namely $n_1$ (the medium in the interior of the notch), $n_2$ (the refractive article, and $n_3$ (the medium between the refractive article and the target region). In such instances the output edge or output surface of the refractive article need not be substantially linear or planar, and instead can be shaped (e.g., curved as needed) to improve the uniformity of light distribution in the target region. Those skilled in the art will appreciate that the equations shown herein can be modified to take into account the third index of refraction and the shape of the output edge or output surface, and thereby calculate the desired shape of the notch.

Figure 9:
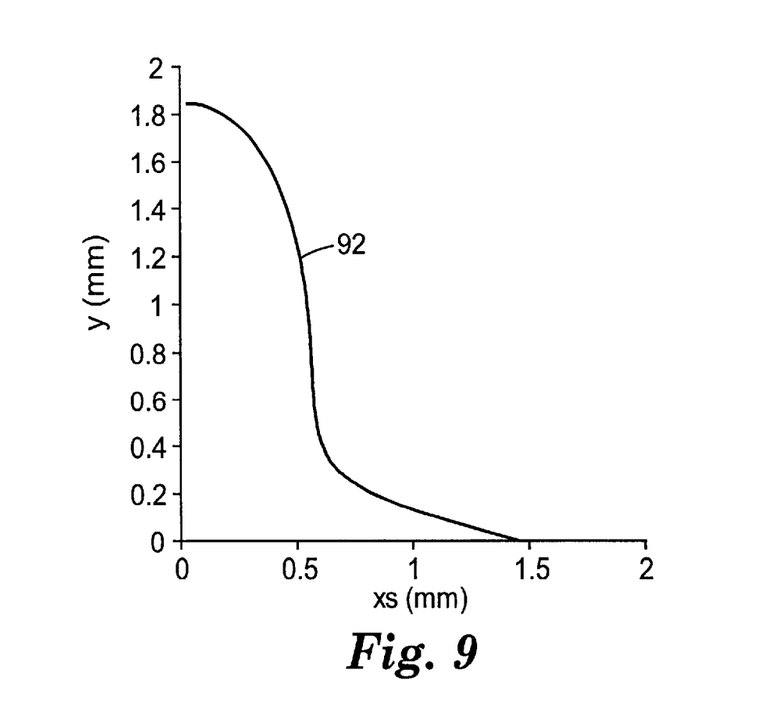
FIG. 9 is a graph showing one-half of a notch or cavity shape for use with a Lambertian light source.

For embodiments in which the target is a target aspect, there typically will be only two applicable indices of refraction, with the medium of index $n_1$ being located between the source and the curved surface, and the medium of index $n_2$ being located between the curved surface and the target aspect. In general, if index $n_1$ is less than $n_2$, then to achieve uniform illumination, the curvature of the notch is preferably convex with respect to the source at high values of $\theta_0$, and concave at low values of $\theta_0$. As an illustration of this relationship, a notch shape for the case of d=5 mm, $x_{f0}$=13 mm, $n_1$=1.35, $n_2$=1.65 and an ideal point source is shown by curve 92 in FIG. 9. This approach facilitates use of a hardenable transparent medium of index $n_1$ to encapsulate the source, thereby providing improved durability and accuracy in alignment of the source to the notch center.

Figure 10:
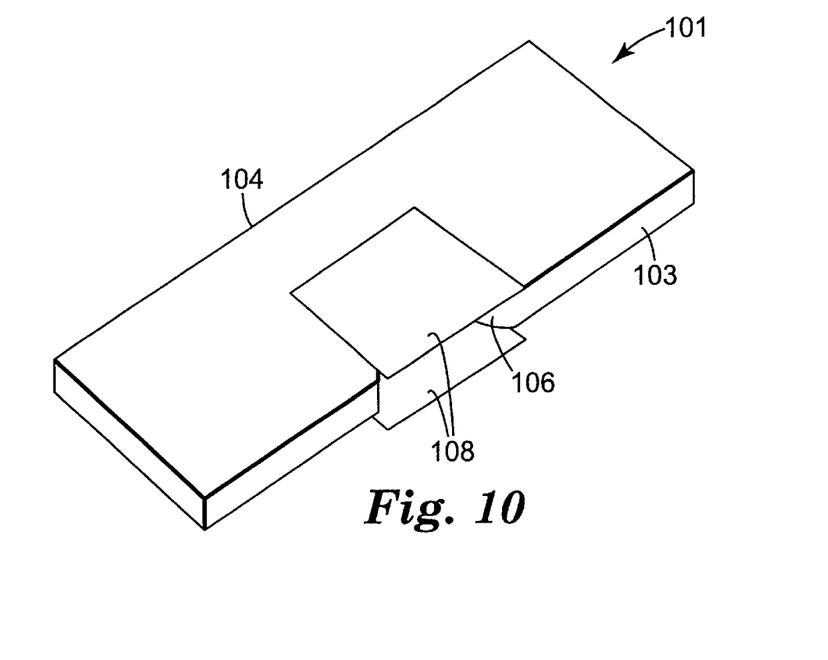
FIG. 10 is a perspective view of a refractive article of the invention, having a notch and reflectors.

For embodiments of the invention involving a notch having open ends, a reflective surface is preferably positioned both above and below the light source to utilize light that might otherwise miss the notch interface. This is shown in FIG. 10, where refractive article 101 having input edge 103, output edge 104 forming a target aspect, and notch 106 is equipped with reflectors 108 above and below the notch.

Figure 11:
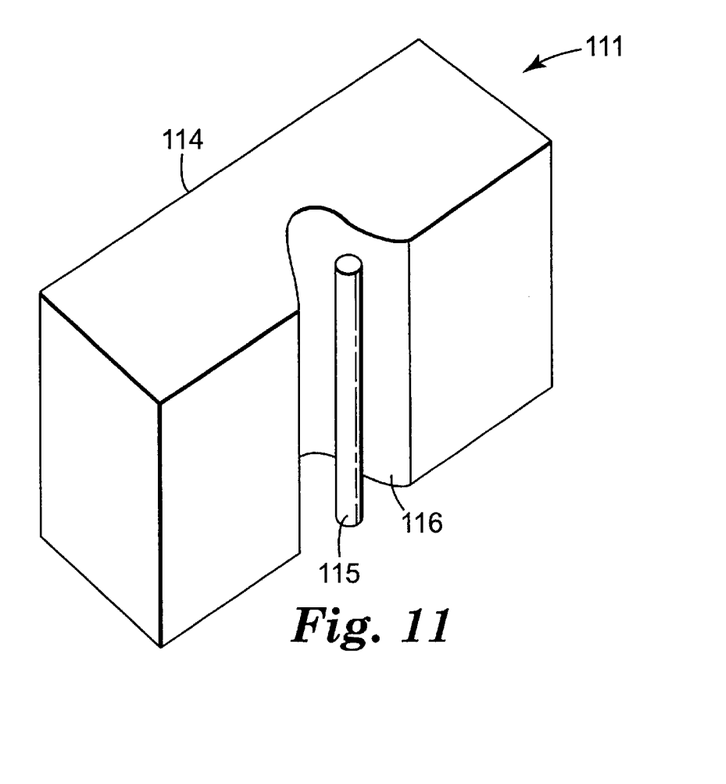
FIG. 11 is a perspective view of another refractive article of the invention, having a notch and a linear light source.

The invention is not limited to light sources or refractive articles that are small in extent in two dimensions. The light source and the media defining the notch may, for example, be extended perpendicular to the plane of the notch. In this manner, as shown in FIG. 11, a substantially linear light source such as a fluorescent tube 115 can be used as the source to create a uniformly illuminated planar output surface 114 forming a target aspect in an elongated refractive article 111.

Figure 12:
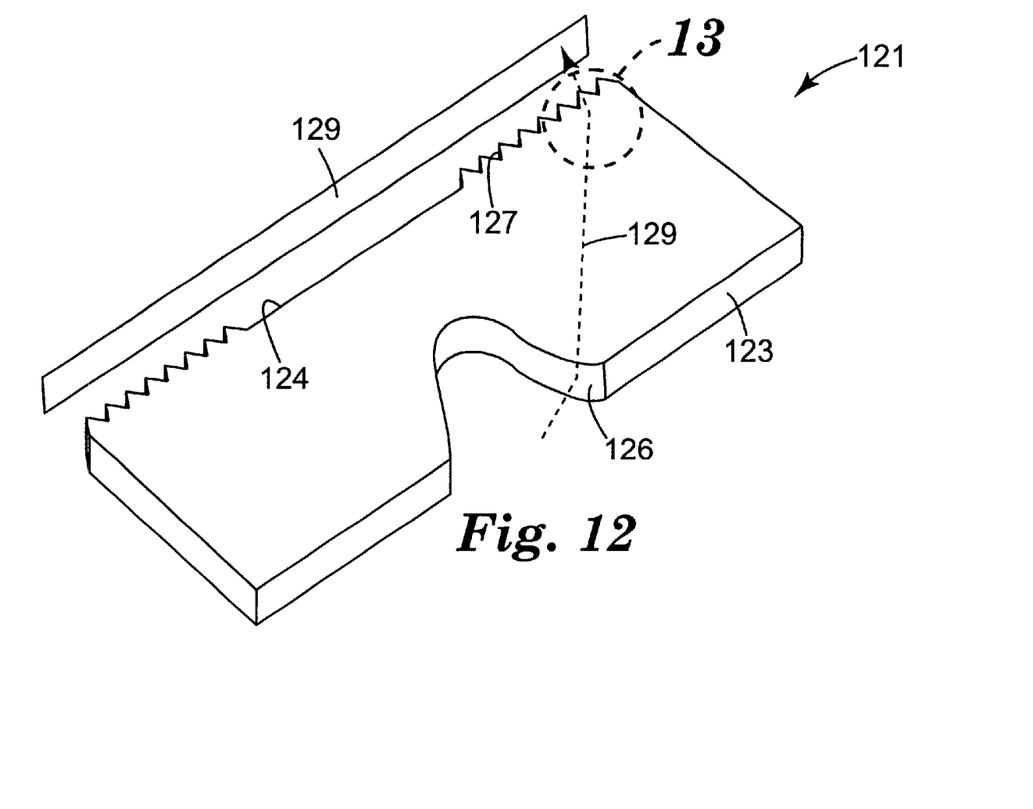
FIG. 12 is a perspective view of a refractive article of the invention, having a notch and prismatic and diffusive light management features.

In another embodiment of the invention, prisms can be attached or otherwise provided on the output edge or surface to further redirect light towards the target and to reduce the exit angle measured from the normal to the target. This is shown in FIG. 12, where refractive article 121 has input edge 123, output edge 124 and notch 126. Output edge 124 is equipped with a series of prisms 127. Prisms 127 refract light rays from the source (not shown in FIG. 12) such as light ray 129 more towards the normal to target region 129. Output edge 124 as shown in FIG. 12 only has prisms along its end regions, as typically only light rays at these extremes will require redirection. However, depending on the desired output light distribution, the entire output edge 124 can include prisms. A diffuser can also be added to article 121, e.g., in the path of light rays traveling to target 129, to further improve illumination uniformity. The diffuser can take a variety of forms, including a roughened prism surface, a coated film of diffuser material, an attached film with a diffuser coating, an attached film of diffuser material, or an injection molded layer of diffusive material. The diffusivity (e.g., the thickness) of the diffuser can vary along its length to achieve a desired illumination distribution. The diffusivity of the diffuser can also vary in more than one dimension across a planar target to achieve the desired light distribution.

Figure 13A:
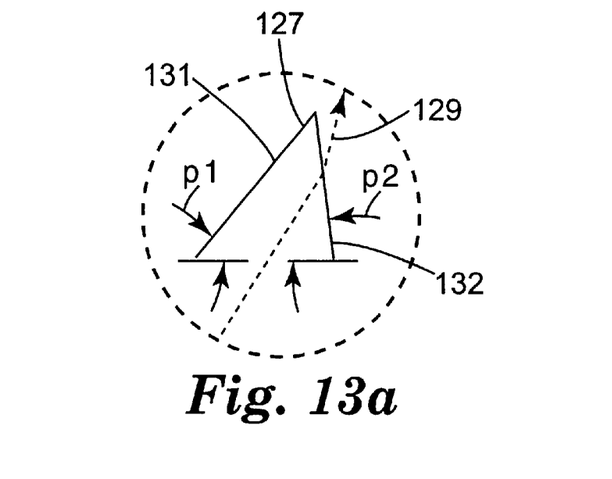
FIG. 13a is a magnified top view of a portion of the prismatic features of the article of FIG. 12.

FIG. 13a shows a prism 127 and the path of light ray 129 through prism 127 at greater magnification. A preferred facet angle p2 for the prism exit facet 132 (measured with respect to the line of prisms) would be about 85 degrees, more preferably about 88 degrees. The other prism facet 131 preferably has a facet angle p1 that is parallel to the average ray incident on the prism exit facet 132. If desired, the angles p1 and p2 can vary along the length of target aspect 124.

Figure 13B:
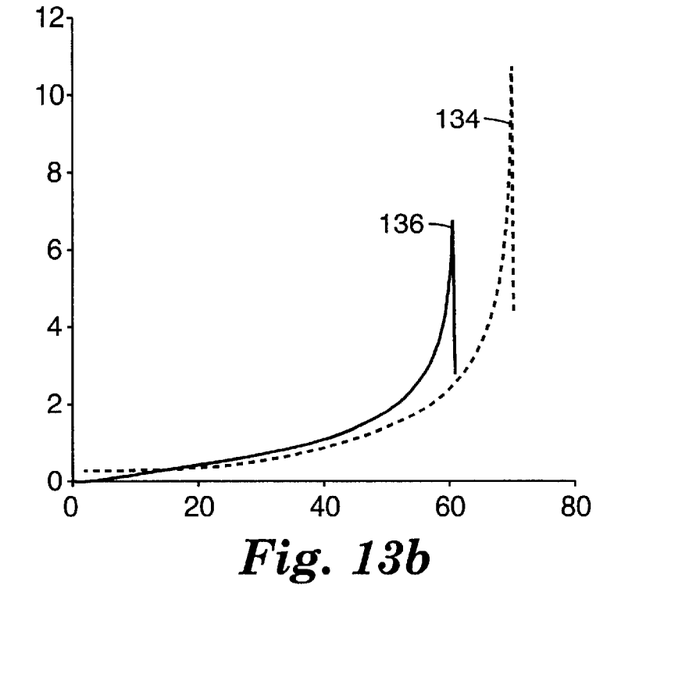

A ray tracing simulation for the design of FIG. 12 is shown in FIG. 13b as curve 134 (without the prismatic features of FIG. 13a) and as curve 136 (with the prismatic features of FIG. 13a). In FIG. 13b, the horizontal axis is the light ray exit angle in degrees with respect to the y-axis, and the vertical axis is the relative illuminance in arbitrary units. The simulation used p2=88 degrees and n=1.49. Angle p1 was set so that face 131 was substantially parallel to the average ray incident on face 132. The effect of the prisms is to shift rays having an exit angle from about 40 to 70 degrees so that they instead have an exit angle of about 40 to 60 degrees.

In another embodiment of the invention, the bulk of the refractive article 121 can be made slightly diffusive to aid in uniformity of illumination. This can be accomplished, for example, by disposing diffusing particles in article 121.

Figure 14:
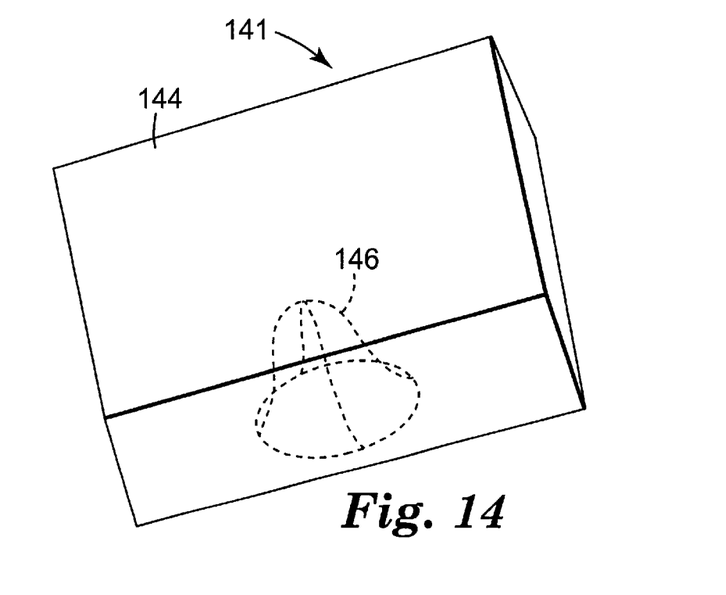
FIG. 14 is a perspective view of a refractive article of the invention, having a noncircularly symmetric cavity.

The embodiments discussed so far have involved notch shapes that are uniformly shaped in two dimensions. The notch design can be further extended into three dimensions by rotation of the two-dimensional notch shape about the central axis of the notch, thereby forming a cylindrical cavity. In the simplest case, where the rotation is circularly symmetric, the resulting light pattern at the output will be circularly uniform. In general, at a fixed distance d to a diffusive surface, values for $x_{f0}$ may be chosen for two orthogonal axes to generate a uniformly illuminated elliptical region. These values are then used to design the desired notch shapes for these axes. The shape along one axis can then be smoothly rotated into the orthogonal shape to provide the required cavity. An example of such an embodiment is shown in FIG. 14, where refractive article 141 has a noncircularly symmetric cavity 146 (shown in phantom) that can be used with an appropriate source (not shown in FIG. 14) to provide uniform illumination of an elliptical area on planar target 144.

The embodiments of the invention are also not limited to embodiment in which $n_1 < n_2$. The design for embodiments in which $n_1 > n_2$ proceeds in a similar manner. Either class of embodiments will provide certain advantages. Embodiments with $n_1 > 1$ and $n_2 = 1$ are exemplified by a lens that is optically bonded to the light source (thereby encapsulating the source) and used in air. The lens redirects rays from the source to provide substantially uniform illumination of a substantially linear or planar target region located a distance d from the source. Typically, for embodiments of the invention in which $n_1 > n_2$, the target is a target region and thus not pert of the refractive article. Such a target is remotely located with respect to the refractive article and receives light from the refractive article by refraction through the medium of refractive index $n_2$. The medium of index $n_1$ is located between the source and the curved surface, and the medium of index $n_2$ is located between the curved surface and the target. The target can be, for example, an elongated region in the case of a slab-like lens, a substantially rectangular region in the case of a two-dimensional lens shape extended in a direction perpendicular to the plane of the lens, or a circular region in the case of a lens shape rotated about the lens central axis. For example, by using the rotation technique discussed above (for rotation of a series of notches to generate a cavity that will uniformly illuminate an elliptical target), a lens can be formed to illuminate an elliptical target region.

Figure 15:
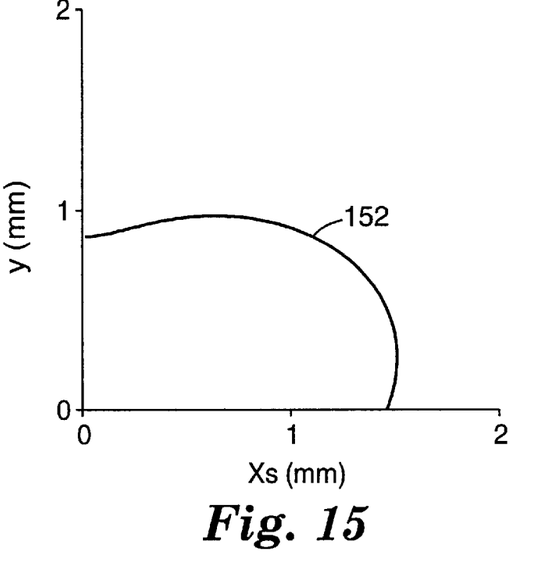
FIG. 15 is a graph showing one-half of the outer edge or surface of a refractive article of the invention that is optically coupled to and which encapsulate a light source.
Figure 16:
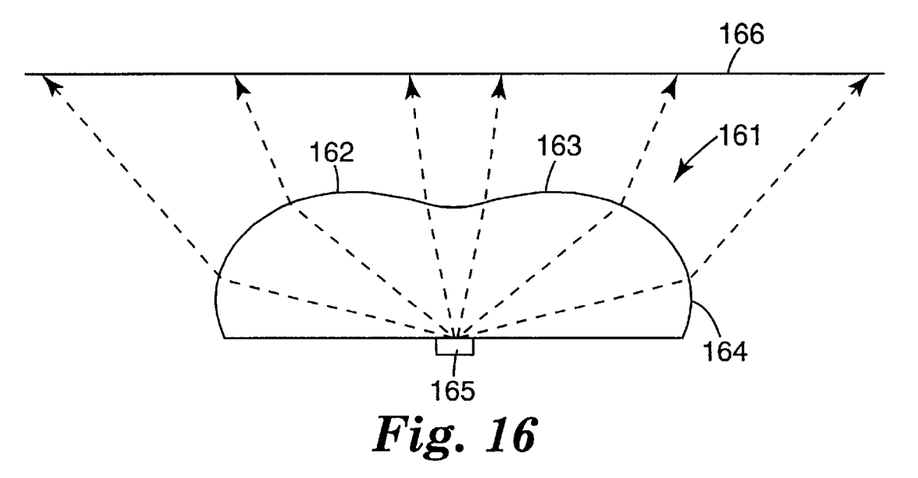
FIG. 16 is a sectional side view of a refractive article of FIG. 15.

In general, if index $n_1$ is greater than $n_2$, then to achieve uniform illumination of a target, the curvature of the lens is preferably concave with respect to the source at high values of $\theta_0$, and convex at low values of $\theta_0$. As an illustration of this relationship, a lens shape for the case of d =5 mm, $x_{f0}$=20 mm, $n_1$=1.58 and $n_2$=1 and an ideal point source is shown by curve 152 in FIG. 15. An example of such a lens (which due to its small size when used on an LED or other small source, could be referred to as a "lenslet") is shown as lenslet 161 in FIG. 16. Lenslet 161 has an outer surface 162 having a first surface portion 163 that is convex with respect to light source 165 A second surface portion 164 is concave with respect to light source 165 and surrounds surface portion 163. Viewed from the outside of lenslet 161, first surface portion 163 is concave and second surface portion 164 is convex. First surface portion 163 and second surface portion 164 are shaped to provide substantially uniform illumination of target region 166 by source 165. This approach facilitates use of a hardenable transparent medium of index $n_1$ to form lenslet 161 and envelop source 165, thereby providing improved durability and improved accuracy in source alignment.

Figure 17:
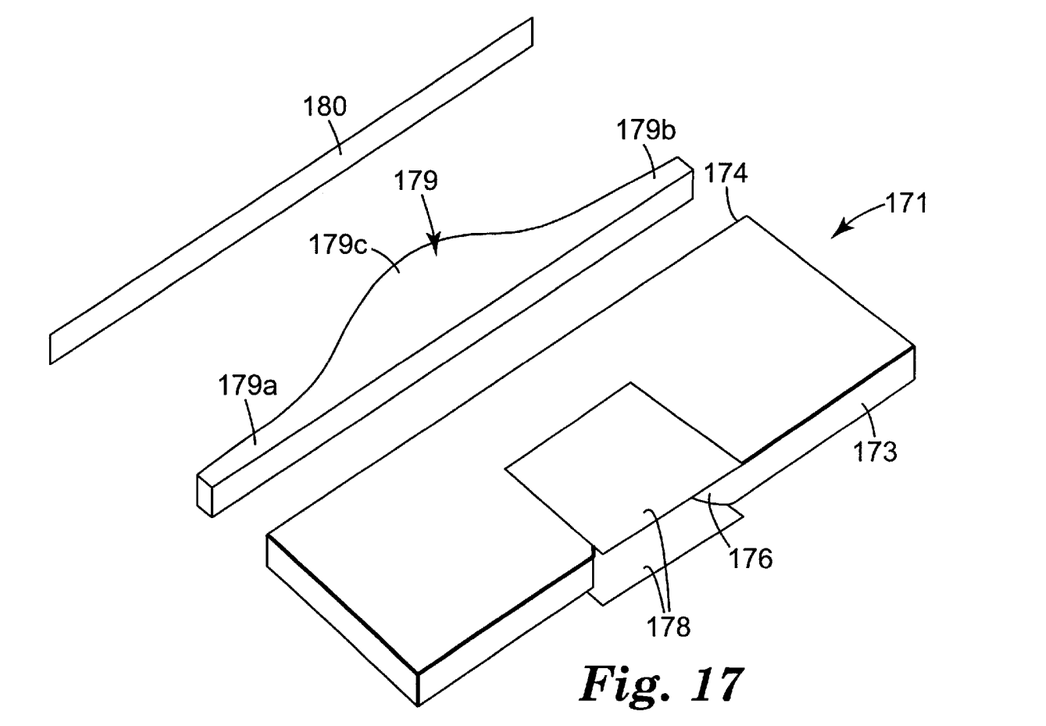
FIG. 17 is a perspective view of a refractive article of the invention, having a notch, reflectors and a shaped diffuser.

Another embodiment of the invention is illustrated in FIG. 17, where light is injected into a refractive slab 171 having notch 176 in input edge 173, reflectors 178 above and below notch 176, and light output edge 174. Light from an LED (not shown in FIG. 17) is refracted through slab 171 and through light output edge 174 toward a shaped diffuser 179. Thinner regions 179*a* and 179*b* at the ends of diffuser 179 disperse light over a smaller range of angles than the thicker central region 179*c* of diffuser 179. The thicker region 179*c* also transmits less light than the thinner regions 179*a* and 179*b*. Shaped diffuser 179 helps to disperse light near the midline of the notch, and thereby provides a more uniform light distribution of target region 180. The diffuser also serves to randomize the angular distribution of light from the source to improve illumination uniformity.

The shaped lighting devices of the invention permit light from a small, point-like source of width w to be used to provide substantially uniform illumination of a large, substantially linear or planar target of substantially greater width (e.g., of at least 5 w, more preferably at least 10 w, and most preferably of about 15 to about 20 w). The intensity of illumination at points within the target preferably is within about ±50% of the average target intensity value, more preferably within about ±20%, and most preferably within about ±10%.

In general, the shaped refractive articles of the invention will find use in any application in which it is desired to convert light from a small, point-like source while achieving good uniformity of illumination. For example, the shaped refractive articles of the invention can be used in a variety of lighting devices. Representative applications include room illumination; task lighting; flashlights; warning lamps; instrumentation; sensors; advertising; vending machines; transportation applications such as traffic signals; vehicular applications such as automotive instrumentation, tail lamps, turn signals and center high-mounted stop lamps; and electronic applications such as frontlights, backlights and electronic displays. The shaped refractive articles of the invention are particularly useful for illuminating subminiature or miniature devices powered by small batteries. Suitable devices include cell phones, pagers, personal digital assistants, clocks, watches, calculators, still and video cameras, laptop computers, vehicular displays and the like. The displays in such devices can be made using a variety of color or monochrome reflective light valves. For example, the display can be a reflective color LCD such as the display used in the COMPAQ iPAQ™ Pocket PC. The shaped refractive articles of the invention can be used to illuminate fixed graphic devices such as posters or signs, and variable-appearance substrates or other reflective displays such as "Gyricon" electronic display material (under development by Gyricon Media Inc.). The shaped refractive articles can also be used to illuminate displays such as the FRONTLIT DISPLAY described in copending application Ser. No. (attorney's docket No. 56153USA5A.002) filed on even date herewith, or illuminated touch panels such as the FRONTLIT ILLUMINATED TOUCH PANEL described in copending application Ser. No. (attorney's docket no. 56050USA3A.002) filed on even date herewith, the disclosure of each of which is incorporated herein by reference. The shaped reflective article can include more than one light source, e.g., three or more LEDs. The shaped reflective article can be used with an array of colored light sources (e.g., one or more of each of a red, green and blue LED) to illuminate a target, with the light sources in the array being electronically energized using a continuous or strobed addressing scheme.

Various modifications and alterations of this invention will be apparent to those skilled in the art without departing from the scope and spirit of this invention. It should be understood that this invention is not limited to the illustrative embodiments set forth above.

We claim:

1. A refractive article comprising an input edge or face, an output edge or face, and at least one notch or cavity in the input edge or face that at least partially envelops a light source and is bell-shaped to provide substantially uniform illumination of a target by die source.

2. A refractive article comprising an input edge or face, an output edge or face, and at least one notch or cavity in the input edge or face that at least partially envelops a light source, wherein the notch or cavity has at least two oppositely signed curved portions shaped to provide substantially uniform illumination of a target by the source, the curved portions comprising a first curved portion near the target that is concave with respect to the light source, and a second curved portion more remote from the target that is convex with respect to the light source, with the second curved portion being shaped to illuminate the target at approximately the same light intensity per unit of target length as the first curved portion.

3. A refractive article according to claim 1, wherein the target comprises a target line or target plane on the refractive article.

4. A refractive article according to claim 1, wherein the target comprises a target line or target plane remote from the refractive article.

5. A refractive article comprising an input edge or face, an output edge or face, and at least one notch or cavity in the input edge or face that at least partially envelops a light source, wherein the light source comprises one or more point-like light sources and the notch or cavity has at least two oppositely signed curved portions shaped to provide substantially uniform illumination of a target by the source.

6. A refractive article according to claim 5, wherein the light source comprises one or more light emitting diodes.

7. A lighting device comprising at least one light emitting diode and a refractive article according to claim 5.

8. A lighting device according to claim 7, further comprising a diffuser as the target.

9. A lighting device according to claim 7, further comprising a diffuser that provides a more uniform light distribution on a target.

10. A lighting device according to claim 9, wherein the diffuser has a length, and a diffusivity that varies along the length of the diffuser to achieve a desired light distribution.

11. A lighting device according to claim 9, wherein the diffuser has a thickness that varies along the length of the target to achieve the desired light distribution.

12. A refractive article according to claim 1, wherein the light source comprises one or more linear light sources.

13. A refractive article that is optically coupled to a light source and has an output edge or surface having at least two oppositely signed curved portions shaped to provide substantially uniform illumination of a target region by the source, the interior of the refractive article between the light source and the output edge or surface being filled with a medium of refractive index $n_1$, and the target region receiving light from the refractive article through a medium of refractive index $n_2$, where $n_2<n_1$.

14. A refractive article according to claim 13, wherein the article has a first curved portion that is convex with respect to the source, to first curved potion being at least partly surrounded by a second curved portion tat is concave with respect to the source, with the second curved portion being shaped to illuminate the target at approximately the same light intensity per unit of target area as the first curved portion.

15. A refractive article according to claim 14, wherein the light source comprises a point-like light source.

16. A refractive article according to claim 14, wherein the light source comprises a light emitting diode.

17. A method for illuminating a target using a light source, comprising refracting light from the source though a refractive article having an edge or surface having first and second oppositely signed curved portions shaped to provide substantially uniform illumination of the target by the source, wherein:

a) the edge or surface has a notch or cavity in the edge or surface that at least partially envelops the source, or b) the article is optically coupled to and at least partially encapsulates the source, and wherein the second curved portion is shaped to illuminate the target at approximately the same light intensity per unit of target length as the first curved portion.

18. A method according to claim 17, wherein the target comprises a target line or target plane on the refractive article.

19. A method according to claim 17, wherein the target comprises a target line or target plane remote from the refractive article.

20. A method according to claim 17, wherein the source comprises one or more point-like light sources.

21. A method according to claim 20, wherein the source comprises one or more light emitting diodes.

22. A method for designing a curved portion of a shaped refractive article to provide substantially uniform illumination of a target by light from a source that is refracted through the curved portion, comprising the step of shaping the curved portion so that it substantially obeys the following equations:

$$\sin\theta_2 = \left(\frac{n_1}{n_2}\right)\sin(\alpha - \theta_0)$$

$$\tan(\alpha - \theta_2) = \frac{x_f - x_s}{d - y}$$

$$\tan\theta_0 = \frac{x_s}{y}$$

$$\frac{dy}{dx_s} = -\tan\alpha$$

$$\frac{dx_f}{d\theta_0} = \left(\frac{1}{C}\right)\frac{dI_0}{d\theta_0}$$

in a Cartesian coordinate space in which the x-axis is parallel to the target, the y-axis is perpendicular to the target, and the source is at the origin, wherein:

$(x_s, y)$ is the position of a point on the curved portion, $\theta_2$ is the angle of refraction of a light ray at position $(x_s, y)$, $n_1$ is an index of refraction between the source and the curved portion, $n_2$ is an index of refraction between the curved portion and the target, $\alpha$ is the angle of the curved portion with respect to the x-axis at position $(x_s, y)$, $\theta_0$ is the angle made by light rays from the source with respect to the y-axis, $x_f$ is the position of a point on the target along the x-axis, d is the distance from the source to the target along the y-axis, $dI_0/d\theta_2$ is the distribution of light from the source, C is the desired illuminance at a point on the target, equal to $I_{00}/2x_{f0}$ $I_{00}$ is the total optical output power of the source and $x_{f0}$ is the half-length of the target, measured along the x-axis.

23. An illuminated display comprising a light source and at least one refractive article according to claim 13.

24. An illuminated article comprising a cellular telephone, pager, personal digital assistant, clock, watch, calculator, still or video camera, laptop computer or transportation vehicle comprising an illuminated display comprising a light source and at least one refractive article that is optically coupled to and at least partially encapsulates the light source, and has an output edge or surface having at least two oppositely signed curved portions shaped to provide substantially uniform illumination of a target region by the source.

25. An illuminated display comprising a light source and at least one refractive article according to claim 1.

26. An illuminated article comprising a cellular telephone, pager, personal digital assistant, clock, watch, calculator, still or video camera, laptop computer or transportation vehicle comprising a display according to claim 25.

27. A method according to claim 17, wherein the source has a width and the notch or cavity has a width greater than the width of the source.

28. A refractive article according to claim 1, wherein the Source has a width and the notch or cavity has a width greater than the width of the source.

29. A refractive article according to claim 2, wherein the target comprises a target line or target plane on the refractive article.

30. A refractive article according to claim 2, wherein the target comprises a target line or target plane remote from the refractive article.

31. A refractive article according to claim 2, wherein the light source comprises one or more point-like light sources.

32. A refractive article according to claim 2, wherein the light source comprises one or more linear light sources.

33. An illuminated display comprising a light source and at least once refractive article according to claim 2.

34. A refractive article that is optically bonded to a light source, has a refractive index $n_1$, and has an output edge or surface having at least two oppositely signed curved portions shaped to provide substantially uniform illumination of a target region by the light source, wherein the target region receives light from the refractive article through a medium of refractive index $n_2$ and $n_2<n_1$.

35. A refractive article according to claim 34, wherein the article has a first curved portion that is convex with respect to the source, the first curved portion being at least partly surrounded by a second curved portion that is concave with respect to the source, with the second curved portion being shaped to illuminate the target at approximately the same light intensity per unit of target area as the first curved portion.

36. A refractive article according to claim 34, wherein the light source comprises a point-like light source.

37. A refractive article according to claim 34, wherein the light source comprises a light emitting diode.

38. A method for illuminating a target using a light source, comprising refracting light from the source through a refractive article optically bonded to the light source and having an edge or surface having first and second oppositely signed curved portions shaped to provide substantially uniform illumination of the target by the source, wherein the second curved portion is shaped to illuminate the target at approximately the same light intensity per unit of target length as the first curved portion.

* * * * *

UNITED STATES PATENT AND TRADEMARK OFFICE
CERTIFICATE OF CORRECTION

PATENT NO. : 6,568,822 B2
DATED : May 27, 2003
INVENTOR(S) : Boyd, Gary T.

It is certified that error appears in the above-identified patent and that said Letters Patent is hereby corrected as shown below:

Column 8,
Line 44, delete "pert" and insert -- part --

Column 10,
Line 24, delete "die" and insert -- the --

Column 11,
Line 12, delete "potion" and insert -- portion --
Line 13, delete "tat" and insert -- that --

Signed and Sealed this

Third Day of May, 2005

JON W. DUDAS
*Director of the United States Patent and Trademark Office*